No. 684,892. Patented Oct. 22, 1901.
J. F. WHITE.
LOADING OR UNLOADING APPARATUS.
(Application filed June 26, 1901.)
(No Model.) 4 Sheets—Sheet 1.
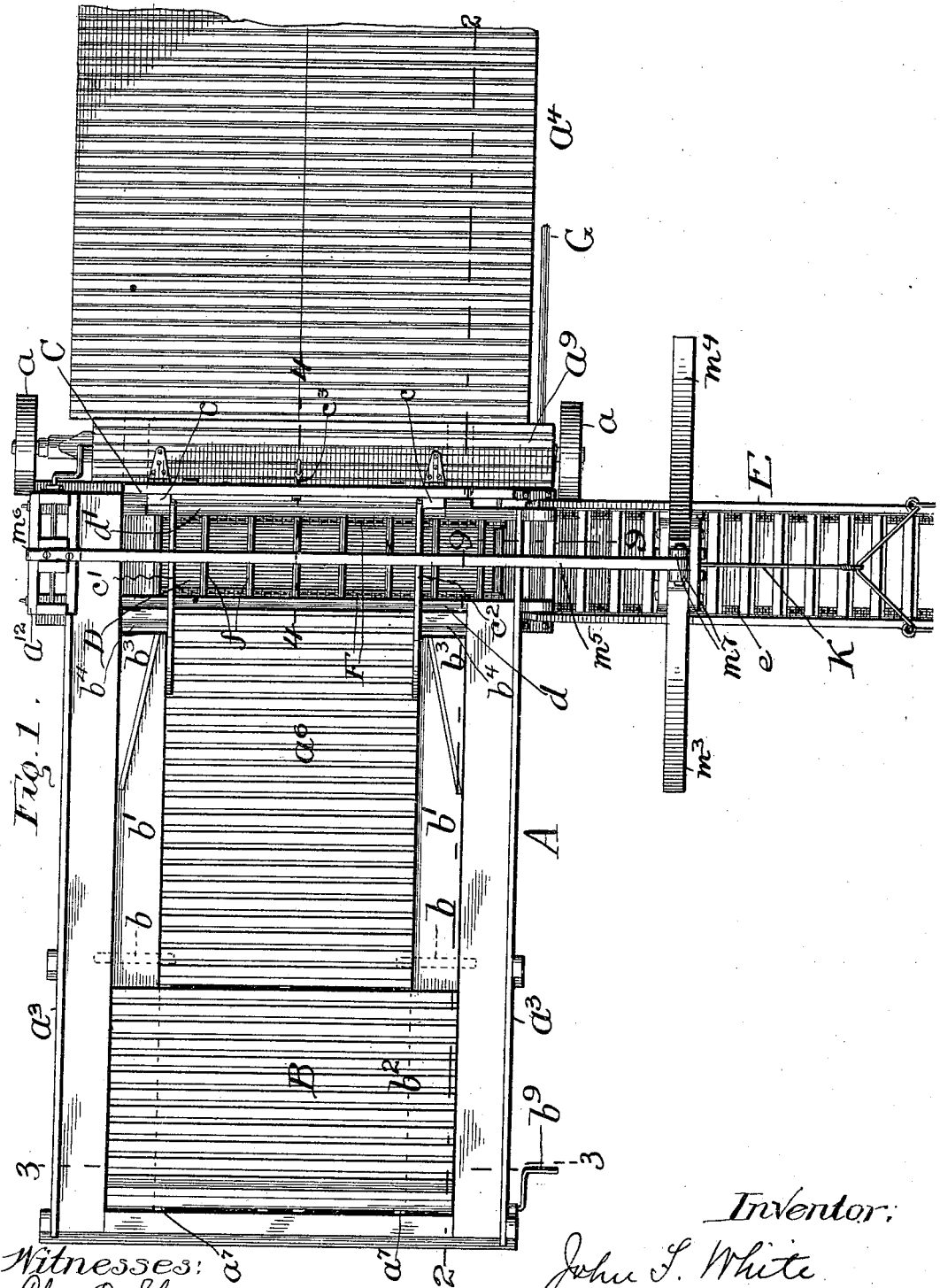
Witnesses:
Chas. O. Shurvey
S. Bliss.
Inventor:
John F. White
by Wills Wrener & Bitner
Attys.

No. 684,892. Patented Oct. 22, 1901.
J. F. WHITE.
LOADING OR UNLOADING APPARATUS.
(Application filed June 26, 1901.)
(No Model.) 4 Sheets—Sheet 2.
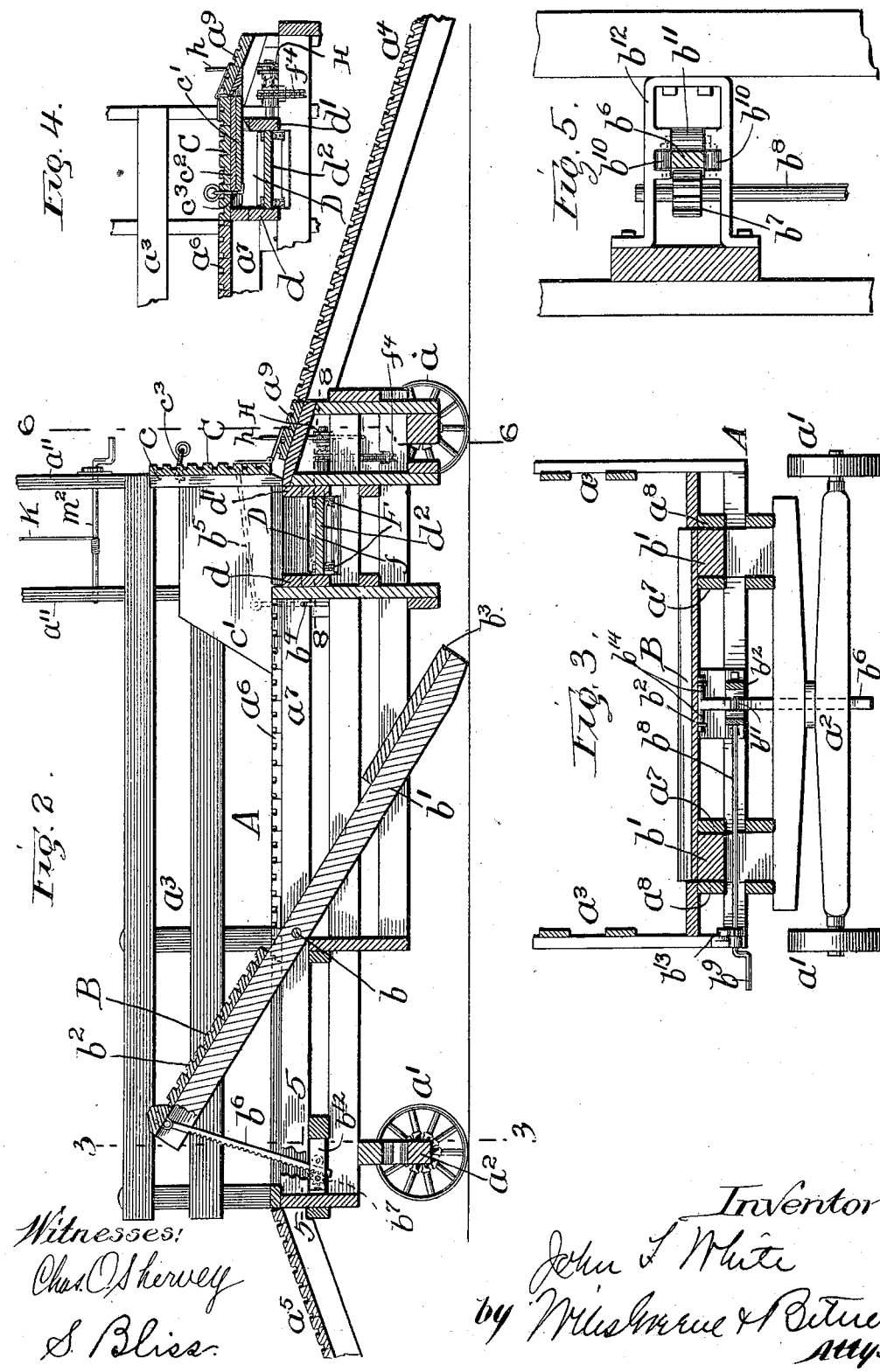

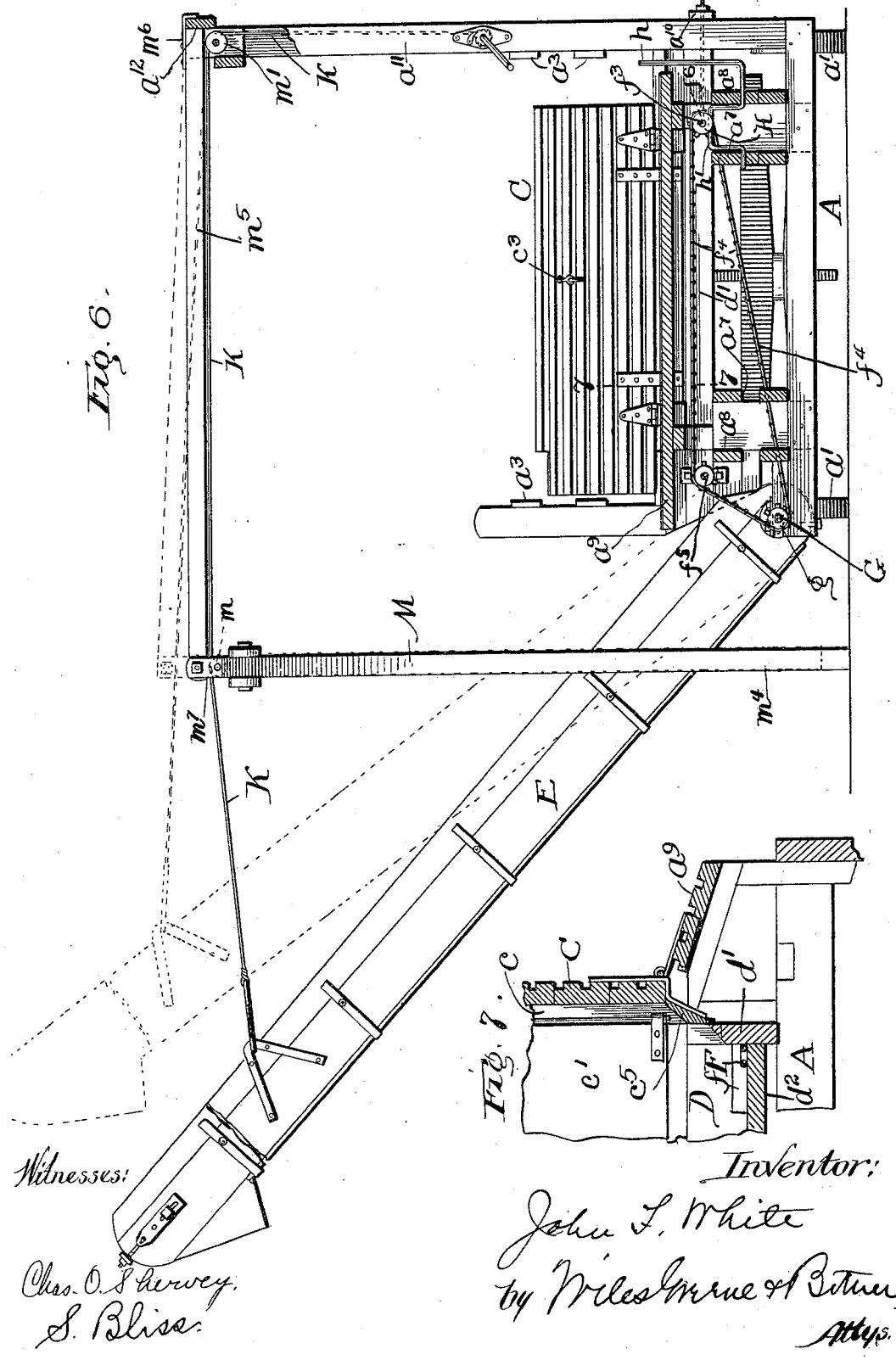

No. 684,892. Patented Oct. 22, 1901.
J. F. WHITE.
LOADING OR UNLOADING APPARATUS.
(Application filed June 26, 1901.)
(No Model.) 4 Sheets—Sheet 4.
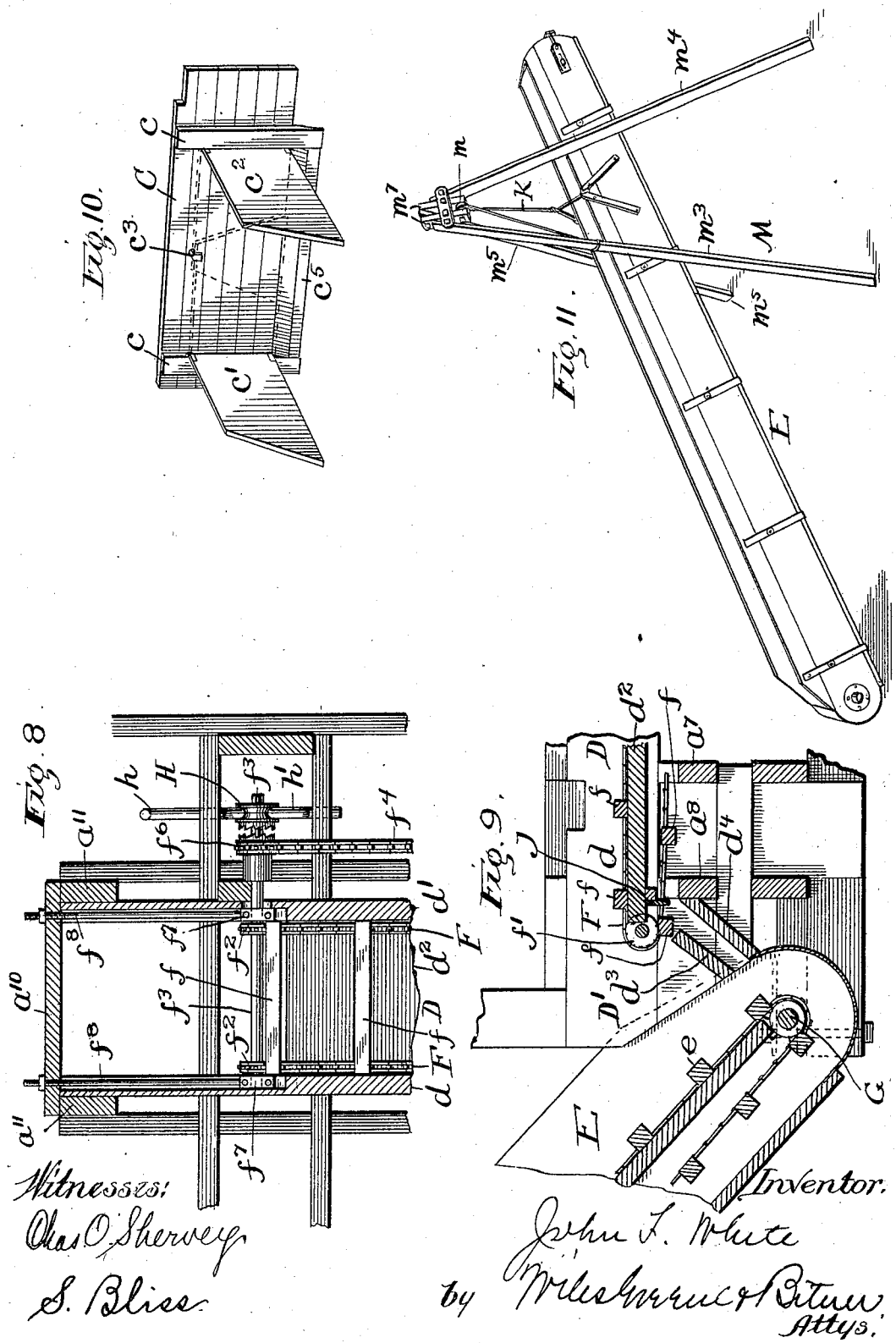
Witnesses:
Chas O. Shervey
S. Bliss
Inventor:
John F. White
by Williamson & Patten
Attys.

UNITED STATES PATENT OFFICE.

JOHN F. WHITE, OF RACINE, WISCONSIN.

LOADING OR UNLOADING APPARATUS.

SPECIFICATION forming part of Letters Patent No. 684,892, dated October 22, 1901.

Application filed June 26, 1901. Serial No. 66,087. (No model.)

*To all whom it may concern:*

Be it known that I, JOHN F. WHITE, a citizen of the United States of America, residing at Racine, in the county of Racine and State of Wisconsin, have invented certain new and useful Improvements in Loading or Unloading Apparatus, of which the following is a specification.

My invention relates to certain improvements in loading and unloading apparatus having reference to that class of devices for handling grains, large and small, or vegetables—such as potatoes, carrots, and the like—which are usually handled with a scoop.
In apparatus of this general class it has been customary to provide a platform upon which to drive the wagon containing the commodity to be elevated into the bin or other receptacle, and the same is also embodied in this construction; but the elevator and certain of its supports are constructed so as to be readily detachable from the remainder of the mechanism, and it may be utilized to convey or elevate the commodity from one point to another without the use of the remainder of the apparatus. Besides this and other important features, special attention has been given to insure the perfect handling of small grains without any loss or waste thereof, also to mechanism for stopping the feed-conveyer during the operation of the elevating-conveyer, and to other details of construction and arrangement designed with a view to making the apparatus a strong, practical, and easily-portable machine, a description of which will be found in the following specification and the essential features more definitely pointed out in the claims.

The invention is clearly shown in the accompanying drawings, in which—

Figure 1 is a plan view of the apparatus with one of the inclined drive-sections removed and the trap-door shown in an open position. Fig. 2 is a longitudinal vertical section taken in line 2 2 of Fig. 1. Fig. 3 is a vertical cross-section taken in line 3 3 of Figs. 1 and 2. Fig. 4 is a vertical longitudinal section taken in line 4 4 of Fig. 1 with the trap-door down or closed. Fig. 5 is a detail horizontal section taken in line 5 5 of Fig. 2. Fig. 6 is a vertical cross-section taken in line 6 6 of Fig. 2. Fig. 7 is an enlarged vertical longitudinal section of the trap-door and adjacent parts, the line of section being taken at
7 7 in Fig. 6. Fig. 8 is a view, partly in plan and partly in horizontal section, of a portion of the frame and feed-conveyer mechanism, the line of section being indicated at 8 8 in Fig. 2. Fig. 9 is a partial vertical cross-section taken in line 9 9 of Fig. 1. Fig. 10 is a perspective view of the trap-door and folding wings, and Fig. 11 is a perspective view of the elevator hung from its supporting-tripod.

Referring to the drawings, A represents a portable truck supported upon wheels $a$ $a'$, the wheels $a'$ being journaled upon the front axletree $a^2$, which turns upon the body of the truck. The truck is preferably provided with side rails or guards $a^3$, and driveways or inclines $a^4$ $a^5$ are provided with the apparatus, the incline $a^4$ being the one upon which the team is driven to bring the loaded wagon upon the truck and the one $a^5$ serving to bring the team and unloaded wagon off the same. They may be readily detached from the truck when not in use and placed upon the same and transported thereby. The truck contains a stationary platform $a^6$, supported upon longitudinal members $a^7$ of the frame of the truck, and a tilting or dumping platform B is pivoted to the longitudinal members $a^7$ and to similar members $a^8$ at $b$. Said dumping-platform is preferably made up of two longitudinal beams or dump-rails $b'$, upon one end of which is secured a platform $b^2$, forming a continuation of the stationary platform $a^6$. The free ends of the dump-rails are provided with triangular cleats $b^3$ to position the rear wheels of the wagon upon the dump-rails. When the dump-rails are in a horizontal position, the end carrying the triangular cleats is supported upon arms $b^4$, (see Fig. 2,) which are pivoted upon the framework and moved under said dump-rails or away therefrom by a rod (shown in dotted lines at $b^5$) which is connected to the trap-door C. When this trap-door is down, the arms are held under the dump-rails; but when opened, said arms are moved out of the way, permitting said dump-rails to tilt down. All of the parts thus far described are embodied in my prior patent, No. 671,122, issued April 2, 1901, for improvements in loading and unloading apparatus, where the devices for locking the end of the dump-rails adjacent to the feed-trough are more fully described.

The fulcrum of the dumping-platform is arranged on one side of the center thereof, so that when the supporting-arms $b^4$ are moved away therefrom the load upon the platform tends to tilt the same into the position seen in Fig. 2, and to prevent the platform from tilting too rapidly a rack-bar $b^6$ is employed, which is pivoted to one end of the dumping-platform and meshes with a pinion $b^7$ upon a shaft $b^8$, which extends beyond the frame of the truck, where it will be seen to be provided with a handle $b^9$ in Fig. 3. The rack $b^6$ is guided between antifriction-rollers $b^{10}$ and held in mesh with the pinion $b^7$ by a roller $b^{11}$, all of which are journaled in a bracket $b^{12}$, supported upon the framework of the truck. This rack-bar, it should be noticed, is placed midway between the sides of the platform, at the end thereof, and when said platform is horizontal—that is, so that the team and load can be driven upon it or during transportation of the apparatus from one place to another said rack-bar lies immediately in front of the fulcrum of the axle-tree $a^2$, so that the latter may turn without breaking off the rack-bar. The pivot member of the rack-bar $b^6$, above referred to, is in the form of two laterally-extending-arms $b^{14}$ and of considerable extent to receive and support the weight of the platform and the load thereupon. Besides this, any inequality of weight upon either side of the center tends to tilt the platform down upon the heavier side; but because of the lateral extent of the arms and the guide-rollers $b^{10}$ this end of the platform is kept approximately level. A pawl and ratchet $b^{13}$ upon the end of shaft $b^8$ prevents turning of said shaft except when the pawl is disengaged from the ratchet, thereby preventing accidental dumping of the platform.

While the shaft has been shown as provided with the handle $b^9$ for its rotation, yet it is obvious that it may be geared to the power for running the conveyers of the apparatus in a manner similar to that in my prior patent above referred to.

Another advantage of the rack-bar is its use in assisting in the dumping of the platform. The pivot thereof may be placed nearer the middle and the load more evenly balanced, and in this case the shaft $b^8$ can be rotated at the proper speed to tilt the wagon as desired, thereby retarding the movement if the load is too heavy on the dumping side of the center or assisting it along if too light. The platform is of course returned to the horizontal position by rotating the shaft $b^8$ in the opposite direction.

Adjacent to the dumping end of the platform B is the feed-trough D, preferably composed of transversely-extending side boards $d$ $d'$ and a floor or bottom $d^2$. This feed-trough is covered by the trap-door C, above referred to, which is hinged to the portion $a^9$ of the stationary platform, which extends from the feed-trough to the edge of the truck. Said trap-door has secured upon it two strips $c$, which project down beyond the lower edge of the platform and rest against the side board $d'$ of the feed-trough when the trap-door is open and prevents it from being thrown open too far. A cleat $c^5$ is secured to the hinged edge of the trap-door to close up the opening between it and the side board $d'$ of the trough when the trap-door is open. Two side boards or wings $c'$ $c^2$ are hinged to the strips $c$, (see Fig. 10,) which are folded upon the trap-door when the latter is to be closed, but are opened out, as seen in Figs. 1 and 2, when the door is raised. These side boards prevent the grain or other commodity handled from being spilled. By hinging them upon the trap-door, so that they may be folded in when not in use and readily swung out in place when needed, a great advantage is derived, because they are always in place and ready for use. A hook $c^3$ is provided for holding the side boards in place when folded up, and said hook extends out through the trap-door, where it is provided with a ring for handling the same. By hanging the side boards to the trap-door they may be used to sweep any grain or other material which may fall upon the stationary platform $a^6$ into the feed-trough.

The feed-trough receives the material from the wagon, where it is carried to an elevating-conveyer E, by which it may be elevated and carried to a suitable bin or other receptacle. A conveyer runs upon the floor of the feed-trough to carry the material to the elevating-conveyer, and said conveyer may be of any of the well-known forms, the one shown being composed of chains F and transverse flights $f$, connecting them. Said chains run over rollers $f'$ at one end and are driven by sprockets $f^2$, fast upon a shaft $f^3$, at the other. The shaft is driven by a chain $f^4$, which receives its motion from a sprocket $g$, fast upon the shaft G, which runs the elevating-conveyer and is connected to a suitable horse-power or other means for its rotation. The chain $f^4$ passes over an idler $f^5$ (see Fig. 6) and around a sprocket $f^6$, loose upon the shaft $f^3$, but adapted to be rotatively connected therewith by a clutch-collar H, which is keyed upon the shaft and moved into or out of engagement with the sprocket $f^6$ by a lever $h$. Said lever is pivoted upon the framework of the truck and has an offset-crank $h'$ engaging a circumferential groove in the clutch-collar H. By rocking the lever $h$ the clutch-collar may be thrown into or out of engagement with the sprocket to connect or disconnect the same from the shaft. The offset-crank $h'$ is of such length as to permit of a certain amount of movement of the clutch-collar upon it, such movement of the clutch-collar being occasioned by the tightening of the conveyer-chains F. The boxes $f^7$, in which the shaft $f^3$ is journaled, are longitudinally movable, and rods $f^8$ are connected thereto, which extend out through a member $a^{10}$ of the frame, where they are screw-threaded and provided with nuts, the tightening up of which stretches the chain and advances the shaft $f^3$. The crank-arm $h'$, because of its lateral extent, remains in engagement with the clutch-collar, so that the latter may be operated by the lever $h$, even with a considerable change of position of the shaft $f^3$. It is quite important that this conveyer should be capable of being thrown out of operation, as it is apt with certain kinds of commodities to feed the same too rapidly to the elevator, thereby "choking up" the latter.

The delivery end of the feed-trough D is provided with a hopper D', (see Fig. 9,) leading to the elevator, and said hopper has an inclined board $d^3$, adapted to form a chute to receive the bulk of the material, and with a second inclined board $d^4$ to receive whatever material may be carried beyond the board $d^3$ by the flights. Grain, &c., is apt to lodge upon the flights $f$ as they pass around the rollers $f'$, and considerable grain has thus been wasted because of its dropping off the flights underneath the bottom $d^2$. To prevent any grain from being carried along with the flights, a scraper J has been employed, which is preferably constructed of some flexible material, such as rubber, leather, &c. Said scraper is secured to a cleat upon the under side of the bottom board $d^2$ and directly over the second board $d^4$ of the hopper, so that all of the flights passing by the same come in contact with this scraper, and any grain which may have lodged thereupon will be brushed into the hopper and dropped into the elevator. When a plain apron or an apron with flights is used in place of the chain and flights, the scraper may be dispensed with and the second board will catch any of the grain which may not fall upon the first board.

The elevator E is of the ordinary form, with a conveyer $e$ running therein, which receives its motion from the shaft G, above referred to. Said shaft passes through the sides of the conveyer and is journaled upon the frame of the truck adjacent to the hopper D', so that the elevator may be tilted to the desired degree to deliver the grain, &c., at the point wanted. The sides of the elevator are adapted to overlap the sides of the hopper to prevent escape of the material at this point. The free end of the elevator is supported by a cable or rope K, passing over two pulleys $m$ $m'$, down to a winding-drum $m^2$. Said drum may be connected by a tumbling-rod to the horse-power or it may be provided with an ordinary crank for its rotation, a pawl and ratchet being employed to keep the shaft from rotating backward to unwind the cable except when desired. The pulley $m'$ is journaled upon two uprights $a^{11}$, secured to the main frame of the truck, and the pulley $m$ is journaled between two blocks $m^7$, supported by two legs $m^3$ $m^4$ of a supporting-tripod M, the third leg $m^5$, when in use in connection with the truck, extending from the upper end of the legs to a cross-bar $a^{12}$ upon the top of the uprights $a^{11}$, where it is provided with a hook $m^6$ to hook over said cross-bar. Said tripod is readily removable from the structure and may be laid upon the truck for transportation or it may be employed in the manner shown in Fig. 11, where it is shown as supporting one end of the elevator, the other end resting upon the ground or other suitable support. In this manner grain or other like commodity may be transferred from a bin or other receptacle into a wagon or other bin, which is often desirable and has usually been accomplished by the aid of a scoop. By the use of this tripod the elevator becomes useful in other ways than upon the truck, thereby increasing the utility of the apparatus in many ways.

It often becomes desirable to move the apparatus a short distance, so as to change the position of the delivery end of the elevator, and to do this it is necessary that the tripod be lifted from the ground. This is easily effected by winding up the cable so as to bring the parts into the position indicated by the dotted lines in Fig. 6, thus raising the two legs of the tripod clear of the ground and allowing the truck to be moved.

Many of the details of construction are capable of modification and alteration without changing the principle of the invention, and I do not, therefore, desire to limit myself to their exact construction.

I claim as new and desire to secure by Letters Patent—

1. In a loading or unloading apparatus, a portable truck, wheels for carrying said truck, one pair of which is journaled upon an axletree, which is swiveled upon the truck, a dumping-platform, a rack connected thereto at the end and approximately midway between the sides, and adapted when said platform is horizontal, to extend down in front of the axletree, a pinion meshing with said rack-bar and suitable means for rotating the pinion; substantially as described.

2. In an apparatus of the class described, having a truck, and removable elevator, a tripod for supporting one end of the elevator one of the legs of which is provided with means for connecting it with the framework of the truck whereby the other two legs of the tripod may be supported in the proper relation therewith, but may be rapidly disconnected therefrom, and the tripod thus formed, serve to support the elevator when disconnected from the truck; substantially as described.

3. In an apparatus of the class described, a truck and removable elevator, a tripod for supporting the free end of the elevator, two of the legs of which are capable of swinging in substantially the same plane, and the third in a plane substantially at right angles thereto, said third leg being adapted to be connected to the frame of the truck to brace the other two legs, whereby said tripod may support the elevator in proper relation with the truck or may be disconnected therefrom and serve as a tripod to support the elevator alone; substantially as described.

4. In a loading and unloading apparatus, the combination with a platform and a feed-trough into which the material may be dumped, of a trap-door, hinged to the platform and adapted to be swung down over the feed-trough and cover the same, and a pair of side boards hinged to the trap-door and adapted to be folded against the same or to be spread out when the door is opened; substantially as described.

5. In an apparatus of the class described, the combination with a platform and a feed-trough, of a trap-door adapted to cover the feed-trough or to be raised therefrom, a pair of folding side boards hinged to the trap-door and a hook for securing them upon the door when folded thereupon; substantially as described.

6. In a loading or unloading apparatus, the combination with a feed-trough and a conveyer moving therein to carry the grain, &c., to an elevator or other device for carrying the grain away from the feed-trough, of a hopper into which the conveyer delivers the grain, having a bottom, and a false bottom, said false bottom being adapted to catch the bulk of the grain, and the real bottom to catch any grain which may be carried beyond said false bottom by the inertia of the conveyer; substantially as described.

7. In a loading or unloading apparatus, the combination with a feed-trough and conveyer running therein, of a receptacle into which said conveyer delivers the grain and a brush in said receptacle adapted to brush any grain which may lodge upon said conveyer into the receptacle; substantially as described.

8. The combination with a conveyer, a shaft for advancing the same, and means for moving the shaft to tighten the conveyer, of gearing, a clutch upon said shaft for throwing the gearing into working engagement with the shaft and a lever for operating the clutch having a crank-arm engaging the clutch and of such lateral extent that the position of the shaft may be shifted to tighten the chain without disengaging the clutch from the crank-arm; substantially as described.

9. The combination with a conveyer, a shaft for advancing the same and means for moving the shaft to tighten up the conveyer, of a sprocket-wheel loose upon the shaft and connected to a suitable source of power, a clutch-collar keyed upon the shaft and adapted to be thrown into engagement with the sprocket-wheel to bring the latter into working relation with the shaft, and a lever having a crank-arm engaging said clutch-collar and of considerable lateral extent whereby when said shaft is moved to tighten the conveyer, the clutch-collar will remain in engagement with the crank-arm; substantially as described.

10. In a loading or unloading apparatus, the combination with a truck, feed-trough, and a conveyer running therein, of an elevator pivoted to the frame of the truck and adapted to receive the grain from the feed-trough, a derrick for supporting the elevator, comprising legs resting upon the ground, an upright frame rising from the truck, a connecting member between said legs and the uprights, a pulley journaled upon the uprights, a winding-drum and a cable leading from the elevator over the pulley to the drum; substantially as described.

11. In an apparatus of the class described, the combination with a stationary platform, of a dumping-platform hinged thereto, a rack-bar having laterally-extending pivoted arms pivoted thereto at one end and approximately between its sides, a pinion meshing with said rack and suitable means for rotating the pinion; substantially as described.

In witness whereof I have hereunto set my hand, at Racine, in the county of Racine and State of Wisconsin, this 17th day of June, A. D. 1901.

JOHN F. WHITE.

Witnesses:
PEARL REED,
WM. SMIEDING, Jr.